No. 786,816.  
Patented April 11, 1905.

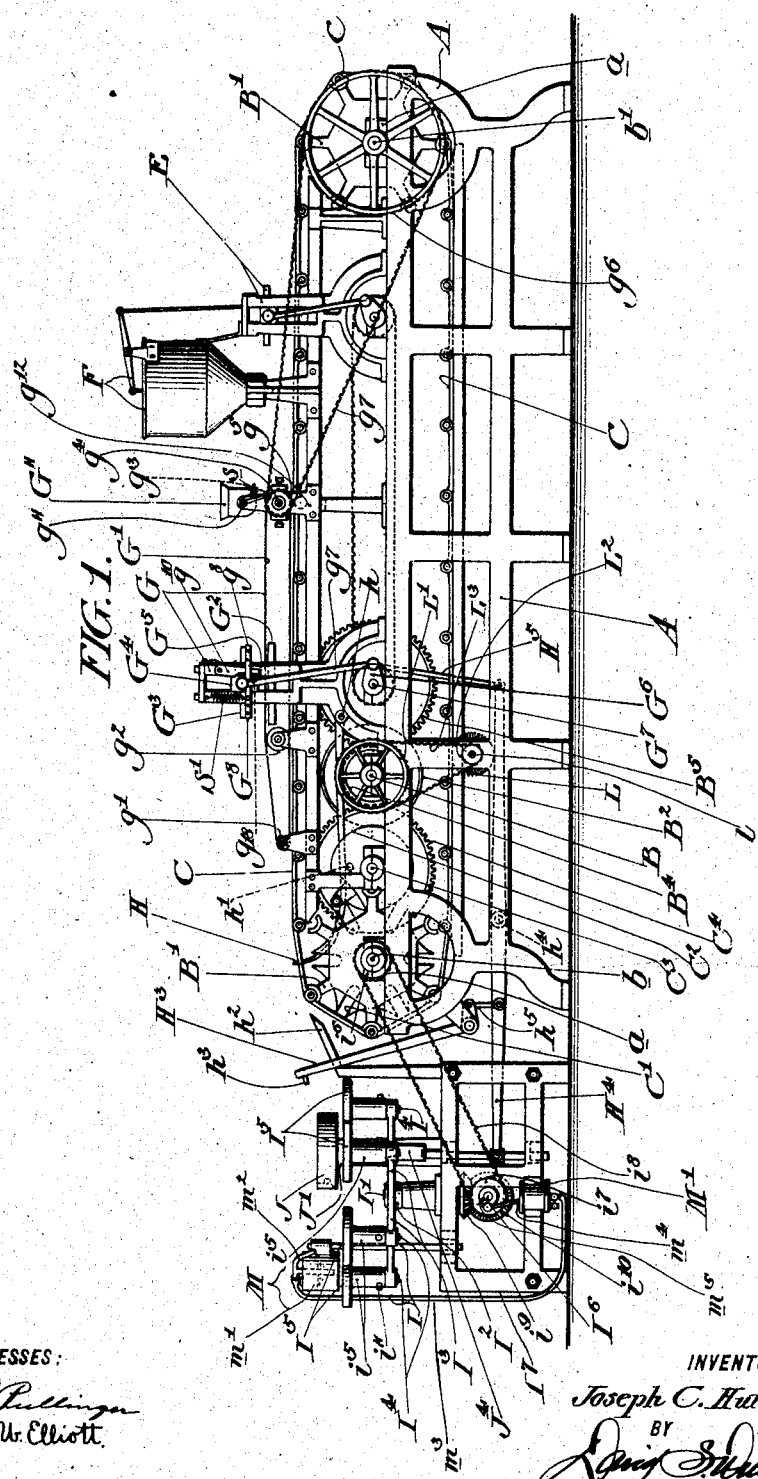

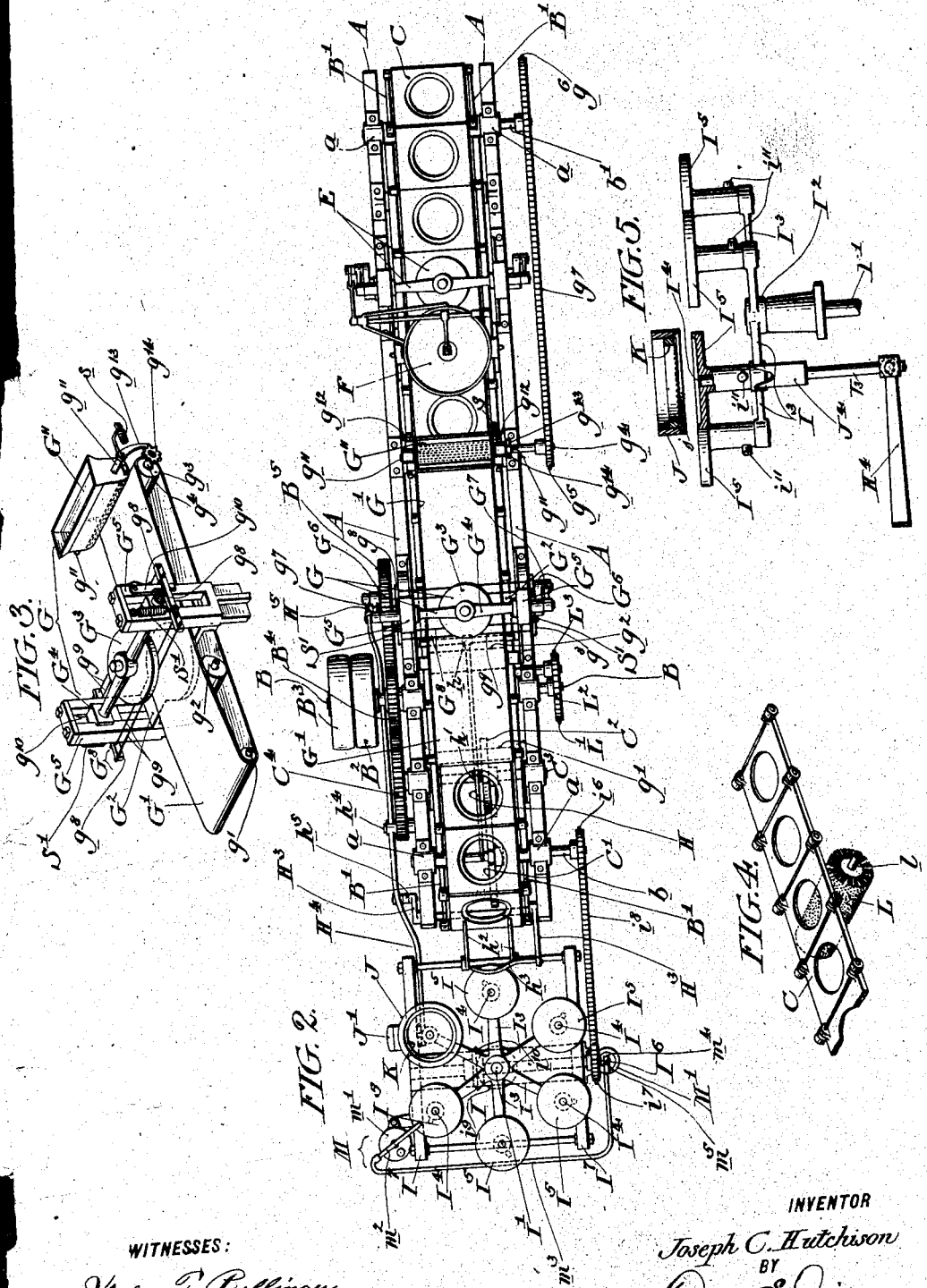

UNITED STATES PATENT OFFICE.

JOSEPH C. HUTCHISON, OF PHILADELPHIA, PENNSYLVANIA.

MACHINE FOR MAKING PIES.

SPECIFICATION forming part of Letters Patent No. 786,816, dated April 11, 1905.

Application filed September 22, 1904. Serial No. 225,430.

*To all whom it may concern:*

Be it known that I, JOSEPH C. HUTCHISON, a citizen of the United States, residing at Philadelphia, in the county of Philadelphia and State of Pennsylvania, have invented certain new and useful Improvements in Machines for Making Pies, of which the following is a specification.

My invention relates to improvements in that class of pie-machines described and claimed in Letters Patent granted to David S. Williams, assignor to Joseph C. Hutchison, No. 740,346, dated September 29, 1903, and in further improvements in the details of construction of the machine shown and described in the pending application of David S. Williams, filed May 16, 1904, Serial No. 208,164.

My present improvements have reference to the top-crust-forming mechanism, and relate to devices for preventing the top crust from adhering to the plunger by which it is molded and to the apron by which it is carried.

My invention further relates to means for cleaning the conveyer and in devices for trimming, crimping, spraying, and delivering the finished product.

The nature of my improvements is illustrated in the accompanying pages of drawings, in which—

Figure 1 illustrates a side elevation of a pie-machine with my improvements in position. Fig. 2 illustrates a plan view of the same. Fig. 3 represents a detached perspective view of the top-crust-forming mechanism, together with my improved devices for releasing the crust from the plunger and apron. Fig. 4 shows a detached perspective view of a portion of the conveyer and the rotary brush employed to remove scraps of dough, flour, &c., from the same; and Fig. 5 is an enlarged side elevation of a portion of the delivery end of the machine, showing the construction and arrangement of the trimming and crimping devices.

A represents the main frame of the machine, provided with bearings $a\ a$ to receive shafts $b\ b'$, upon which are mounted sprocket-wheels $B'\ B'$, carrying the conveyer C. The conveyer is constructed in the same manner as that described in the inventions previously referred to, consisting of a series of members fitted to receive pie-plates and united together to form a continuous belt.

The conveyer C may be manually supplied with plates or fed by a device similar to that shown in the patent above referred to, after which each plate in turn is provided with a portion of dough which is pressed into the form of a lower crust by a plunger comprising a portion of a lower-crust-forming mechanism E. The lower crusts are then carried forward and brought under the action of a filler mechanism F, where a measured quantity of fruit or meat is obtained, after which the unfinished pie is carried forward to receive the top crust.

The top-crust-forming mechanism, which is designated by the letter G, comprises an apron G', mounted upon rollers $g'$, $g^2$, and $g^3$, the latter of which has a shaft $g^4$, upon which is mounted a sprocket-wheel $g^5$, driven from the shaft $b'$ by a sprocket-wheel $g^6$ and sprocket-chain $g^7$. At the receiving end of the apron G' is a flour-sifter, consisting of a trough $G^{11}$ extending transversely across the apron G' and having a perforated bottom. The trough $G^{11}$ is provided with trunnions $g^{11}$ $g^{11}$, which are supported in brackets $g^{12}$ $g^{12}$. The flour contained in the trough is sifted upon the apron G' by imparting to the trough a quick oscillating motion through the agency of a lever $g^{13}$, which projects downward from the trough and impinges against the face of a ratchet-wheel $g^{14}$ on the shaft $g^4$. The lever $g^{13}$ is held in engagement with the ratchet-wheel $g^{14}$ by a spring S, one end of which is fastened to the trough and the other to one of the brackets $g^{12}$. Below the apron G' is a stationary bed-plate $G^2$, and above the apron is a movable plunger $G^3$. This plunger is adjustably secured to a cross-head $G^4$, guided in uprights $G^5\ G^5$ and operated by cranks $G^6$ $G^6$ on the shaft $G^7$ through the medium of connecting-rods $g^7\ g^7$. The shaft $G^7$ is driven from a main driving-shaft B, which has fast and loose pulleys $B^2$ and $B^3$, together with a pinion $B^4$, which meshes with a spur-gear $B^5$, mounted on the shaft $G^7$.

The cake of dough from which the crust is to be molded is manually placed upon the apron G' in front of the trough G¹¹ and is brought forward by the apron and placed under the action of the plunger G³, where it is pressed into the form of a pie-crust of the requisite size and thinness. In order to prevent the thin crust from adhering to the plunger as the latter rises, I insert between the plunger and the apron a stripper G⁸, composed of end pieces $g^8$ $g^8$, guided in the uprights G⁵, and thin metal strips $g^9$ $g^9$, which are projected across the face of the plunger and secured to said end pieces. The metal strips are held against the face of the plunger by springs S' S' on either side of the machine, the lower ends of these springs being connected to the end pieces $g^8$ and the upper ends to the uprights G⁵. During the downward motion of the plunger the stripper is normally carried with it until it has reached the lowest point of its downward movement, when by the action of spring-pressed latches $g^{10}$ $g^{10}$ engaging the top of each of the end pieces the stripper is caused to remain down for a time while the plunger is rising. When the plunger has advanced a certain distance in its upward movement, pins $g^{18}$ $g^{18}$ on the crosshead G⁴ come in contact with the sides of the latches and release them from engagement with the end pieces $g^8$ $g^8$, allowing the springs S' to return the stripper to its normal position. The finished crust is then carried by the apron G' and deposited upon the lower crust, carried by the conveyer C. The shaft $b$, carrying sprocket-wheels supporting one end of the conveyer, is provided with a star-wheel C', operated by a corresponding ratchet member C² on a shaft C³, and this shaft is in turn operated from the main driving-shaft B by a gear-wheel C⁴ engaging the pinion B⁴.

The partly-finished pie, together with the plate, is lifted from the end of the conveyer by an arm H, which is fulcrumed to the frame of the machine at a point $h$ and operated to eject the plate and its contents from the conveyer by a pin $h'$ on the ratchet member C². The plate containing the pie is then moved forward over guides $h^2$ $h^2$ by a hook $h^3$ in the upper end of a bell-crank lever H³, which is connected to a rocking lever H⁴ by a link $h^5$. The rocking lever H⁴ is fulcrumed to the frame of the machine at a point $h^4$ and is operated by a connecting-rod H⁵ and one of the cranks G⁶, the latter of which is mounted upon the shaft G⁷. The hook $h^3$ of the bell-crank lever H³ conveys the plate and pie from the conveyer C to one of the plates I⁵ in a turn-table I, by which the plate and its contents are further carried to a stationary die J, where the edges of the crusts are trimmed and crimped and the plate and its contents prepared for baking.

The turn-table I comprises a central shaft I', mounted upon a hub I², having a number of radial arms I³, provided at their end with spindles I⁴, upon which are guided the hubs $i^5$ of the plates I⁵. The turn-table I is intermittently turned by being driven from the shaft $b$ through the agency of sprocket-wheels $i^6$ and $i^7$, sprocket-chain $i^8$, and bevel-gears $i^9$ and $i^{10}$. The bevel-gear $i^9$ is fastened to the shaft I' of the turn-table, while the bevel-gear $i^{10}$, as well as the sprocket-wheel $i^7$, is mounted upon a shaft I⁶, supported in bearings in a frame I⁷.

The trimming-die J is supported by a bracket J' and has a tapered edge $j$, against which the rim of the pie-plate is pressed by an upward movement of the plates I⁵, thus severing the irregular edges of the pie-crusts. In addition to its outer cutting-surface the die J is provided with an inner ring K, which is suitably crimped or corrugated for the purpose of imparting a like design to the edge of the crust and at the same time unite the upper and lower crusts more closely together. The plates I⁵, one at a time, are brought under the action of the die J by the rocking lever H⁴, which has fulcrumed at one of its ends a rod J³, carrying a notched plate J⁴, which is guided in the frame A'.

Each of the hubs $i^5$ of the plates I⁵ has a pin $i^{11}$, which is first acted upon by the notched plate J⁴ to bring the plate I⁵ into alinement with the die J and afterward by a further movement cause the trimming and crimping of the crusts carried by the plate I⁵. After the trimming and crimping operation has been performed the plate containing the pie is lifted from the turn-table and conveyed to the oven for baking.

In order to remove the scraps of dough, flour, and the like from the conveyer C, I employ a rotary brush L, the shaft $l$ of which is journaled in bearings in the frame A and which may be driven from the main driving-shaft B by any suitable train of gearing. As shown in the drawings, this driving mechanism comprises a large sprocket-wheel L', mounted upon the shaft B, a small sprocket-wheel L², mounted on the shaft $l$, and a sprocket-chain L³, uniting the sprocket-wheels together.

The final treatment which the pie receives is that of covering the upper crust with a fine spray of a material which is adapted to cause a browning and glazing of the top crust. This is accomplished by means of an atomizer M, comprising a receptacle $m'$, provided at the top with an atomizing-tube $m^2$, supplied with air by a hose $m^3$, leading from a pump M'. The pump is driven from the shaft I⁶ by means of a connecting-rod $m^4$ and crank $m^5$.

Having described my invention, what I claim, and desire to secure by Letters Patent, is—

1. In a machine for making pies in combination, a plate-conveyer, a plunger mechanism, and a stripper adapted to move with the plunger, to leave the plunger at the end of its downward travel and to again return to the plunger after the same has ascended, substantially as specified.

2. In a machine for making pies in combination, a conveyer, a plunger mechanism, a stripper mechanism and means to cause the stripper to move with the plunger in its downward movement, to dwell and to again move with the plunger in its upward movement, substantially as specified.

3. In a machine for making pies in combination, a conveyer, a plunger mechanism, a stripper, means to cause the stripper to move downward with the plunger, a latch to engage and hold the stripper at the extent of its downward course and means controlled by the plunger for releasing the latch, substantially as specified.

4. In a pie-machine, in combination with the plate-conveyer and the crust-forming mechanism, a plate-ejector located at the discharge end of the conveyer, a stationary trimming and crimping die, and means for conveying the plate and its contents from the conveyer to the trimming and crimping die, substantially as specified.

5. In a pie-machine, in combination with the plate-conveyer mechanism and crust-feeding mechanism, a stationary trimming and crimping die, and a turn-table arranged to lift the plate and its contents and bring the same into engagement with the trimming and crimping die, substantially as specified.

6. In a pie-machine, in combination with the plate-conveyer and crust-forming mechanism, a stationary trimming and crimping die, a turn-table, means for lifting the plate and its contents from the plate-conveyer and depositing the same upon the turn-table and means for elevating a portion of the turn-table to bring the plate and its contents into engagement with the trimming and crimping die, substantially as specified.

7. In a pie-machine in combination, a plate-conveyer, a crust-forming mechanism, an apron for said crust-forming mechanism, a duster for said apron, a plunger, a stripper adapted to move to and from said plunger, a trimming and crimping die, means for conveying the pie to and from said die, and a rotary brush for cleaning the conveyer, substantially as specified.

8. In a pie-machine, in combination with the conveyer mechanism and upper and lower crust-forming mechanism, a receptacle adapted to contain a glazing material, a spraying-nozzle mounted upon said receptacle and a pneumatic device for operating the nozzle, substantially as specified.

In testimony whereof I affix my signature in presence of two witnesses.

JOSEPH C. HUTCHISON.

Witnesses:
ARNOLD KATZ,
NORMAN W. ELLIOTT.